UNITED STATES PATENT OFFICE 2,454,785

METHOD OF MAKING UREA-ALDEHYDE RESIN DISPERSIONS

Loy S. Engle, Harrington Park, and Edward Sheridan, South Bound Brook, N. J., and Earl K. Fischer, Long Island City, N. Y., assignors to Interchemical Corporation, New York, N. Y., a corporation of Ohio No Drawing. Application June 11, 1941,
Serial No. 397,548

3 Claims. (Cl. 260—33.4)

This invention relates to dispersions of pigments in readily heat-convertible solvent-soluble carbamidealdehyde resins, and is directed to a novel method for effecting such dispersions on malaxating machinery.

In the production of dispersions of pigments in organic film-forming vehicles containing volatile solvents, the malaxation method is preferred for the production of pigmented high-gloss finishes. In this method, the vehicle solids, or a portion thereof, are worked up with the pigment, and if necessary, sufficient solvent to yield a plastic, in a machine capable of manipulating the heavy plastic, and the pigment is dispersed in the vehicle by the shearing action of the plastic as it is being manipulated; the finished composition is made by adding solvent and additional solids to the dispersion. Two-roll mills, with rolls operating at different speeds, give the best gloss; heavy-duty dough mixers and Banbury mixers may also be used for this type of dispersion, although results are not so good as with the two-roll mill.

While the malaxation method for dispersion is highly desirable, its use in the production of rapidly heat-convertible finishes from solvent-soluble carbamidealdehyde resins has been greatly restricted, due to the fact that when these resins are malaxated with pigment in the plastic state for a sufficient time to disperse the pigment, at least a portion converts to the insoluble state, so that the dispersions can not be made into smooth coating compositions. This result occurs no matter how low the roll temperatures are kept by cooling fluids; apparently the heat of friction which develops in the plastic sets the resin before it can be absorbed by the cooling fluid. It has been necessary, with finishes of this type, to effect malaxation (if the pigment is dispersed in this manner) with the plasticizer which appears in the final composition, and not with the basic heat-convertible resin.

We have discovered that malaxation of pigment with heat-convertible urea-aldehyde resins can be successfully carried out by the use in the composition of a solvent for the resin boiling within the range of 100° C. to 250° C. and by maintaining the aqueous extract of the mixture neutral or slightly alkaline, combined with cooling of the mill. If these precautions are observed, a smooth dispersion can be obtained which readily produces a composition of the desired type.

Aliphatic alcohols having from 4 to 10 carbon atoms, such as hexyl, capryl, and octyl alcohols, are preferred among the various solvents. Solvents boiling below 100° C. are definitely too volatile and therefore have insufficient anti-gelling action to be satisfactory; and both n-butyl and n-amyl alcohols are very volatile for work on the preferred malaxating mill, the two roll rubber mill.

Where the aqueous extract of mixture of pigment and resin is acid (as is ordinarily the case, since acid-catalyzed resins are generally used, and since many pigments are themselves strongly acid) it is necessary to add a retarding agent. Nitrogenous bases which are difficultly volatile, but can be volatilized by heat, are preferred for this purpose—examples are morpholine, the ethanolamines, the amyl amines etc.

Typical examples of the invention are the following:

Example 1

Thirty parts by weight of high color carbon black, preferably in bead or pellet form, is mixed in a dough mixer with 100 parts by weight of a urea resin solution containing 60% solid resin in a mixture of equal parts of hexyl and octyl alcohols. The carbon black should give an aqueous extract which has a pH of 7.0 or higher. A heavy, plastic paste results and if malaxation is continued for a period of about one hour, the pigment is obtained in suitable fine dispersion. Cooling water should be circulated through the jacket of the mixer and the mixing chamber should be covered. After the initial period of malaxation, 60 parts of the resin solution are added slowly, followed by 40 parts of hexyl alcohol. The resulting stock dispersion is a smooth paste containing 15% carbon black and may be formulated into a finished coating composition as illustrated in Example 2.

Example 2

A quantity of 200 parts of urea resin solution, 80% in octyl alcohol, is placed on the rolls of a two roll "rubber" mill and there are then added gradually 62 parts of carbon black treated to give an alkaline aqueous extract. Mill operation is continued for a period of about twelve minutes with cooling water circulating in the rolls. If necessary, small quantities of octyl alcohol may be added to the mass on the rolls during milling in order to maintain suitable consistency for malaxation and sheeting; addition of solvent is common practice for other types of dispersions.

The dispersion may be removed in the form of a sheet and cut into solvents by means of a dough mixer, high speed stirrer, or other suitable means. A convenient formulation follows:

| | Parts by weight |
|---|---|
| Dispersion | 40 |
| Butyl alcohol | 40 |
| Xylene | 20 |
| | 100 |

A composition spray application for a baking finish may be made according to the following formula:

| | Per cent |
|---|---|
| Carbon black | 1.5 |
| Urea resin (as solid) | 18.0 |
| Plasticizing alkyd (as solid) | 18.0 |
| Solvents (total) | 62.5 |
| | 100.0 |

Example 3

Following the milling procedure of the preceding example, a dispersion of a toluidine red toner may be prepared. The proportions for the mill grind are 25 parts of pigment and 75 parts of urea resin, 80% solids in octyl alcohol. A total milling time of fifteen minutes suffices for high dispersion quality. The resulting chip may be stored for use in various types of metal decorating finishes, textile inks, etc.

Other solvents than those indicated in the examples have been successfully used in carrying out the invention, and among these benzyl alcohol and terpineol may be mentioned.

It should be noted that it is essential to use the solvent in relatively small quantities—in general, about 60% resin solids in the solution is a minimum for proper malaxation. This can sometimes be attained by evaporation of solvent on the roll. In order to retain solubility after malaxation, the alcohol should be maintained to at least 10% of the weight of the carbamide resin.

Where pigments are acid, it is often possible to make them useful in our process by exposing them to the fumes of a volatile amine, and allow the pigment to adsorb the vapors. Normally acid carbon black, for example, may be exposed to monoamylamine vapors, and yields a very satisfactory neutral to alkline pigment.

Examples can of course be multiplied indefinitely without departing from the scope of our invention as defined in the claims.

We claim:

1. The method of dispersing pigment in a heat-convertible urea-aldehyde resin without gelling the resin, which comprises malaxating a mixture of the pigment and a 60% to 90% solution of the resin in a solvent boiling within the range of 100° C. to 250° C., while cooling the malaxating machine, the proportion of pigment to resin solution being such as to yield a malaxatable plastic.

2. The method of dispersing pigment in a readily heat-convertible urea-formaldehyde resin without gelling the resin, which comprises malaxating a neutral to alkaline mixture of pigment and a 60% to 90% solution of the resin in a solvent boiling within the range of 100° C. to 250° C., while cooling the malaxating machine, the proportion of pigment to resin solution being such as to yield a malaxatable plastic.

3. The method of dispersing pigment in a readily heat-convertible urea-formaldehyde resin without gelling the resin, which comprises malaxating a neutral to alkaline mixture of pigment and a 60% to 90% solution of the resin in an aliphatic alcohol having from 4 to 10 carbon atoms and boiling within the range of 100° C. to 250° C., while cooling the malaxating machine, the proportion of pigment to resin solution being such as to yield a malaxatable plastic.

LOY S. ENGLE.
EDWARD SHERIDAN.
EARL K. FISCHER.

REFERENCES CITED

The following references are of record in the file of this patent:

UNITED STATES PATENTS

| Number | Name | Date |
|---|---|---|
| 1,787,239 | Fleischmann et al. | Dec. 30, 1930 |
| 2,249,795 | Theis | July 22, 1941 |